(12) United States Patent  (10) Patent No.: US 7,503,588 B2
Nilsen et al.  (45) Date of Patent: Mar. 17, 2009

(54) PIPE NIPPLE

(75) Inventors: Martin J. Nilsen, Hampshire, IL (US); Michael E. Ward, Geneva, IL (US); Robert E. Brunner, St. Charles, IL (US); James M. Van Ingen, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/936,859

(22) Filed: Sep. 9, 2004

(65) Prior Publication Data

US 2005/0029803 A1  Feb. 10, 2005

Related U.S. Application Data

(63) Continuation-in-part of application No. 10/460,127, filed on Jun. 12, 2003, now abandoned.

(60) Provisional application No. 60/410,745, filed on Sep. 13, 2002.

(51) Int. Cl.
*F16L 33/00* (2006.01)

(52) U.S. Cl. .................. 285/239; 285/238; 285/256

(58) Field of Classification Search .............. 285/239, 285/143.1, 136.1, 201, 314, 358, 370, 397, 285/256, 259, 137.11, 139.1, 139.2, 139.3, 285/238, 209, 240, 146.1, 145.3
See application file for complete search history.

(56) References Cited

U.S. PATENT DOCUMENTS

| 230,895 A | 8/1880 | Safford |
|---|---|---|
| 651,134 A | 6/1900 | Dickens |
| 1,343,967 A | 6/1920 | Gilson |
| 1,509,802 A | 9/1924 | Weigand |
| 1,528,967 A * | 3/1925 | Bersted ............... 285/146.1 |
| 2,139,745 A | 12/1938 | Goodall |
| 2,333,350 A | 11/1943 | Weatherhead, Jr. |
| 2,468,338 A | 4/1949 | MacWilliam |
| 3,408,092 A | 10/1968 | Appleton |
| 3,684,319 A | 8/1972 | Samartina |
| 3,874,714 A | 4/1975 | Bebinger |
| 3,992,044 A | 11/1976 | Muslin |
| 4,018,459 A | 4/1977 | Mominee et al. |
| 4,163,573 A | 8/1979 | Yano |
| 4,405,160 A * | 9/1983 | Tyuuman ............... 285/39 |
| 4,412,693 A * | 11/1983 | Campanini ............. 285/39 |
| 4,457,544 A | 7/1984 | Snow et al. |

(Continued)

FOREIGN PATENT DOCUMENTS

CN  1053024 A  7/1991

(Continued)

*Primary Examiner*—Aaron M Dunwoody
(74) *Attorney, Agent, or Firm*—Mark W. Croll; Paul F. Donovan

(57) ABSTRACT

A pipe nipple has a bore therethrough, with an entrance chamber at one end of the bore having a larger diameter adjacent a drive configuration of narrower diameter for receiving a tool therein to rotate the nipple about its longitudinal axis. The exterior of the nipple has a surface formation as a stop against which a hose can be inserted over the nipple, and a threaded length for attaching the nipple to another device.

12 Claims, 1 Drawing Sheet

U.S. PATENT DOCUMENTS

| | | | |
|---|---|---|---|
| 4,519,636 A | 5/1985 | Tomlin et al. | |
| 4,611,828 A | 9/1986 | Brunet | |
| 4,614,370 A | 9/1986 | Gartner | |
| 4,712,810 A | 12/1987 | Pozzi | |
| 4,733,890 A | 3/1988 | Vyse | |
| 4,817,997 A | 4/1989 | Ingram | |
| 5,240,291 A | 8/1993 | Zornow | |
| 5,317,799 A | 6/1994 | Chapman et al. | |
| 5,487,571 A | 1/1996 | Robertson | |
| 5,537,721 A | 7/1996 | Oetiker | |
| 5,573,281 A | 11/1996 | Keller | |
| 5,636,887 A | 6/1997 | Petropoulos et al. | |
| 5,911,448 A | 6/1999 | Feher | |
| 5,951,064 A | 9/1999 | Cotter | |
| 6,102,442 A | 8/2000 | Gretz | |
| 6,109,659 A | 8/2000 | Heidenreich et al. | |
| 6,116,573 A * | 9/2000 | Cornette et al. | 251/214 |
| 6,325,107 B1 * | 12/2001 | Usui | 138/146 |
| 6,386,596 B1 * | 5/2002 | Olson | 285/321 |
| 2003/0230895 A1 | 12/2003 | Brown et al. | |

FOREIGN PATENT DOCUMENTS

| | | |
|---|---|---|
| CN | 1053492 C | 8/1995 |
| CN | 2313518 Y | 4/1999 |
| CN | 1269002 A | 10/2000 |
| FR | 810 096 | 3/1937 |
| FR | 2 652 773 | 4/1991 |

* cited by examiner

PIPE NIPPLE

CROSS-REFERENCE TO RELATED APPLICATIONS

The present application is a continuation-in-part of U.S. application Ser. No. 10/460,127, filed Jun. 12, 2003, now abandoned, which claims the benefit of U.S. Provisional Application No. 60/410,745, filed Sep. 13, 2002.

FIELD OF THE INVENTION

The present invention relates generally to pipe nipples, and, more particularly, the present invention relates to pipe nipples used as transition pieces between hoses and other system components in automobile cooling systems.

BACKGROUND OF THE INVENTION

Pipe nipples are commonly used as transition pieces in fluid systems of all types. In a basic form thereof, a pipe nipple is a short piece of pipe with each end adapted for connection to other components or other pipes within the fluid system. Pipe nipples are known for use in providing a threaded connection to an adjacent component and to provide an end area for connecting a hose or other flexible conduit to the nipple.

It is known to use pipe nipples in automobile cooling systems as a transition piece between cooling system components such as, for example, a water pump, and a hose conducting coolant to or from the pump. One end of the nipple has external threads thereon for threaded engagement with a threaded port on the pump, and the other end of the pipe nipple is adapted to receive a prepared end of the coolant hose. A ring clamp is used to secure the hose on the nipple. A portion of the nipple between the threads and the opposite end of the nipple is provided for external engagement by a tool used to turn the nipple and rotate the nipple threads into or out of the threads of the threaded pump port. The portion of the nipple engaged by the tool may be round or may have flattened faces, depending on the type of tool to be used for rotating the nipple. Known nipples of this type have been manufactured by machining processes.

Known automotive cooling system nipples have disadvantages and inadequacies. Manufacturing a cooling system nipple by screw machining or other similar cutting equipment inherently leaves grooves on all surfaces that are touched by the machine tool. Such grooves on the interior surface of the pipe nipple bore are problematic to some degree. A rough surface along which the coolant flows increases the friction co-efficient in the pipe nipple, which then tends to inhibit the flow of coolant through the nipple. Moreover, a rough surface promotes the accumulation of corrosive products, which not only may adversely affect the strength of the connector, but also further inhibit flow through the pipe nipple.

On relatively short nipples, as commonly found in automotive cooling systems, the external surface provided for driving or rotating the nipple is small. Thus, it is difficult to engage the nipple with the proper drive tool, and positioning the tool off the drive surface can damage the threads on one end of the nipple or damage the mating surface for the hose on the other end of the nipple. If driven with a common wrench, it is necessary to rotate the nipple a short distance, disengage, reposition and re-engage the wrench to rotate the nipple a further distance, continuing repetitively until the nipple is properly seated in the water pump or removed therefrom. This procedure can be time consuming. Further, the more times that the tool is disengaged from and re-engaged with the pipe nipple increases the possibility that the tool will be improperly positioned, causing the aforementioned damage or not properly seating to drive the nipple. U.S. application Ser. No. 10/460,127 filed Jun. 12, 2003 discloses a pipe nipple that can be driven in rotation by a tool inserted therein; however, aligning the tool for proper driving engagement can be difficult. The internal drive configuration of the nipple is at one end of the bore through the nipple. The drive tool must be axially aligned with the nipple as it approaches the end of the nipple, or the tool will not engage the drive configuration properly. In confined spaces this can be difficult.

To effectively seat the hose on the nipple in a fluid tight connection, the end of the hose is stretched somewhat to slide over the nipple. When the hose is applied over the nipple end, it is difficult to verify the length of the nipple portion within the hose. If an insufficient length of the nipple is in the hose, the ring clamp applied there around may not function effectively.

What is needed in the art is a pipe nipple formed by processes not using cutting tools on fluid contacting surfaces with a more effective drive configuration for the nipple that facilitates engagement by drive tools.

SUMMARY OF THE INVENTION

The present invention provides a pipe nipple particularly suited for automotive cooling systems which is formed by cold forming processes, has an elongated internal drive configuration, and can be provided with a positive stop for the end of a hose applied thereon. An entrance chamber to the internal drive configuration facilitates tool insertion and alignment.

In one aspect thereof, the present invention provides a method of manufacturing a pipe nipple for an automobile cooling system, with steps of cold-forming material into the shape of the nipple, including creating a substantially cylindrical body having first and second ends and a bore therethrough; and shaping the bore at one of the ends to include an entrance chamber of relatively larger diameter and a drive configuration narrower in diameter than the entrance chamber. The drive configuration is between the entrance chamber and the other end, and is shaped to receive a tool therein for rotating the nipple about a longitudinal axis of the nipple. The method includes creating a thread along a portion of the body from the end thereof opposite the end having the entrance chamber.

In another aspect thereof, the present invention provides a nipple with a cylindrical body having an outer surface, first and second ends and a longitudinal bore there through. The first end has a helical thread thereon, and the second end has an outwardly extending enlargement and is configured to receive a hose thereon. The bore is configured at the second end with an entrance chamber of comparatively larger diameter and a drive configuration of comparatively narrower diameter. The drive configuration is shaped for receiving a tool therein for axially rotating the nipple, and is disposed inwardly from the entrance chamber relative to the second end.

In a further aspect thereof, the present invention provides a pipe nipple for an automobile cooling system. The nipple has a cylindrical body with an outer surface, a first end having a thread adapted for engagement with threads of a cooling system component, a second end adapted to be received in a cooling system hose, and an axial bore extending there through. The bore defines an entrance chamber at the second end and a drive configuration between the entrance chamber and the first end. The drive configuration is shaped for receiving a tool therein for rotating the nipple about the axis thereof. The entrance chamber is of larger diameter than the drive configuration.

In a still further aspect thereof, the present invention provides a manufacturing system for making a pipe nipple for an automobile cooling system with means for cold-forming material into the shape of the nipple. The means for cold forming includes means for creating a substantially cylindrical body having first and second ends and a bore therethrough, and means for shaping the bore at one of the ends to include an entrance chamber of relatively larger diameter and a drive configuration narrower in diameter than the entrance chamber, the drive configuration being between the entrance chamber and the other end and being shaped to receive a tool therein for rotating the nipple about a longitudinal axis of the nipple. The system has means for creating a thread along a portion of the body from the end thereof opposite the end having the entrance chamber.

An advantage of the present invention is providing a pipe nipple particularly suited for automotive cooling systems, in which the fluid contacting surfaces are not formed by cutting tools, thereby eliminating even micro-scratches from machining on the surfaces.

Another advantage of the present invention is providing a pipe nipple having a large contact area for engagement by a tool or tools to rotate the nipple.

Still another advantage of the present invention is providing a stop on the exterior of the pipe nipple for verifying that an end of the hose applied over the end of the nipple has been applied sufficiently far onto the nipple.

A further advantage of the present invention is providing a pipe nipple configured to facilitate the insertion and alignment of a drive tool for rotating the nipple.

Other features and advantages of the invention will become apparent to those skilled in the art upon review of the following detailed description, claims and drawings in which like numerals are used to designate like features.

Figure 1:
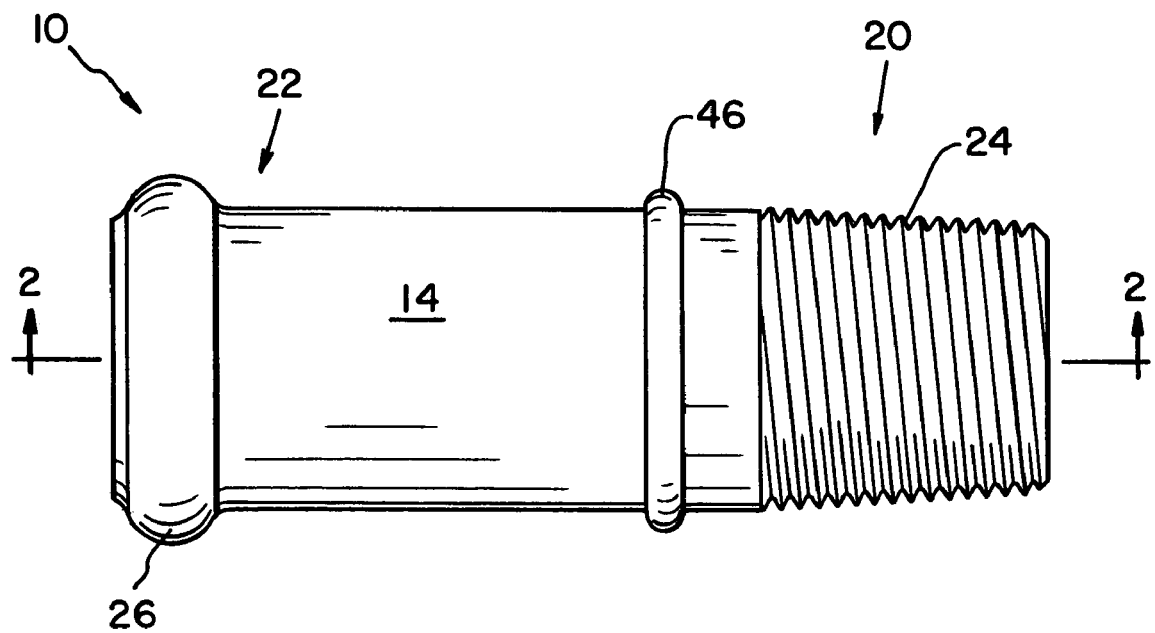
FIG. 1 is an elevational view of a pipe nipple in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a pipe nipple in accordance with the present invention. Nipple 10 is particularly suited for use in an automotive cooling system, to serve as a transition between, for example, a hose of the cooling system and a water pump in the cooling system. However, it should be understood that pipe nipples in accordance with the present invention can be used for other purposes within automotive cooling systems and for other fluid systems of other types.

Nipple 10 is an elongated, generally cylindrical body 12 having an exterior surface 14 and an axial bore 16 defined by an interior surface 18. Body 12 has a first end 20 and a second end 22. A portion of exterior surface 14 from first end 20 inwardly toward second end 22 is provided with a convention pipe thread 24. Pipe thread 24 is of a pitch and depth to engage female threads in a fluid system component to which nipple 10 is to be attached. For example, pipe threads 24 can be provided to engage a threaded port of a water pump (not shown).

Second end 22 is adapted to receive thereon a hose (not shown) of an automotive cooling system. Second end 22 is provided with a radially extending circumferential enlargement 26 slightly inwardly from an outer edge 28 of second end 22. The diameter of nipple 10 at outer edge 28 is provided to readily receive a hose (not shown) inserted thereon. However, the diameter of enlargement 26 is slightly larger than the inside diameter of the hose (not shown), causing the house to stretch as it is slid over enlargement 26. Exterior surface 14 is provided of a diameter to snuggly engage the hose.

For rotating nipple 10 about its longitudinal axis, to drive the nipple relative to the threaded member to which nipple 10 is connected, a drive configuration 40 is provided in bore 16. Configuration 40 commences a spaced distance inwardly from second end 22 and continues toward first end 20. In the exemplary embodiment shown, bore 16 is provided with six corner angles 42 (two of which are shown) by which a hexagonal drive tool can be inserted into bore 16 for rotating nipple 10. With an internal drive configuration 40 within bore 16, ratcheting tools or other powered rotary tools are more easily used for rotating nipple 10. Configuration 40 extends within bore 16 toward first end 20, terminating at a shoulder 44 against which a drive tool can rest, when fully inserted in configuration 40.

Exterior surface 14 is provided with one or more surface formations 46, such as a circumferential, outwardly extending ring 46, which provides both a visual and physical indication when a hose (not shown) has been extended a sufficient distance over nipple 10. With a hose (not shown) applied with its end against surface formation 46, a ring clamp or hose clamp (not shown) can encircle the hose between formation 46 and enlargement 26 to properly seal the hose against the nipple in a fluid tight connection. Those skilled in the art will understand that surface formation 46 can be discontinuous or one or more small projections to serve as a stop for a hose inserted thereagainst. Surface formation 46 can be formed by metal pinching or other similar processes well known to those skilled in the metal forming arts.

Second end 22 is configured internally with an entrance chamber 50 extending inwardly from outer edge 28 to the start of internal drive configuration 40. Entrance chamber 50 is of larger diameter than is drive configuration 40. An angular shoulder 52 angles radially inwardly from entrance chamber 50 to drive configuration 40. Slightly enlarged entrance chamber 50 facilitates the alignment and insertion of a drive tool that will fit snugly in drive configuration 40. The drive tool will enter chamber 50 even if not accurately aligned axially with nipple 10, but is influenced toward the proper axially aligned relationship by angular shoulder 52. Thus, the drive tool is easy to insert and properly position for tightening the nipple.

Nipple 10 is formed of steel or other metals by known cold forming processes such as, for example, eyelet forming or metal drawing. Using punches, dies and the like without machining or cutting to form the elongated structure of body 12 eliminates contact by cutting tools on interior surface 18. The formation of scratches on interior surface 18 is reduced, and the potential for accumulation of corrosive components on surface 18 is minimized. Further, fluid flows smoothly and efficiently along interior surface 18, with reduced drag from the reduced presence of surface irregularities.

Drive configuration 40 and entrance chamber 50 of larger diameter are created during the cold forming process. Thread 24 is formed by any suitable thread forming process, such as machining.

Figure 2:
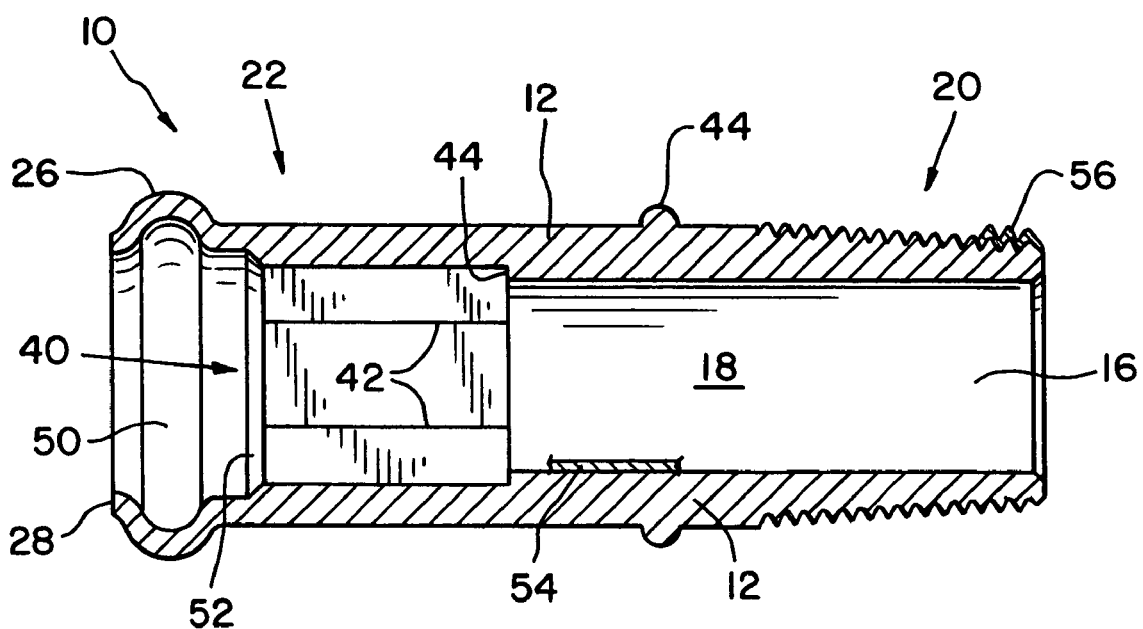
FIG. 2 is a cross-sectional view of the pipe nipple shown in FIG. 1, taken along line 2-2 of FIG. 1.

Nipple 10 can be surface-coated or surface-treated as appropriate for the intended use of nipple 10. For example, when used in an automotive coolant circuit, it is advantageous that nipple 10 be plated or coated with zinc plating, nickel or other protective coatings that will withstand contact from coolant circulated therethrough. Baths and electro-plating can be used to apply the desired material. A fragmentary portion of a protective coating or layer 54 is shown in FIG. 2 along bore 16, but it should be understood that layer 54 may be applied throughout bore 16 and can be applied on both the inside and outside surfaces of nipple 10. Protective layer 54 can cover nipple 10 completely.

To create a fluid-tight connection of thread 24 in the component in which nipple 10 is installed, a sealing material such as a coating or plating of known joint sealing materials is applied to threads 24. Teflon based thread sealant compounds can be used and may be applied to nipple 10 as a more or less permanent coating over thread 24, which also may include coating layer 54. Again, a fragmentary portion of a thread sealant layer 56 is shown in FIG. 2. Those skilled in the art will understand that layer 56 substantially covers the area of thread 24.

In using nipple 10, thread 24 is aligned with the mating threads of the component to which nipple 10 is to be attached, and attachment can be initiated by hand rotation of nipple 10. To tighten the nipple in the component, the appropriate tool is inserted into entrance chamber 50 and drive configuration 40, and is rotated to tighten the nipple. By driving nipple 10 from an end thereof, ratcheting tools and the like are used more easily than with conventional nipples rotated by tools engaging exterior surface. With nipple 10 of the present invention, the drive tool is inserted in drive configuration 40 only once, and the danger of damaging threads 24 or of damaging the area of exterior surface 14 on which a hose will be seated is reduced substantially. It is not necessary to engage, disengage and re-engage tools on exterior surface, as with known nipples.

Tools can be positioned and inserted easily into drive configuration 40 by inserting the tool end through the opening at second end 22, generally at outer surface 28. As the tool enters chamber 50, it approaches drive configuration 40 even if not accurately aligned therewith. As the drive tool encounters angular shoulder 52, the drive tool is influenced toward the properly aligned position for entering drive configuration 40. The proper drive tool can approach nipple 10 from a wide range of angles and still enter entrance chamber 50, which is of larger diameter than drive configuration 40. The internal arrangement of bore 16, including angular shoulder 52, directs the drive tool into proper alignment with drive configuration 40, for engagement therewith. Once properly aligned and positioned, the tool fits snuggly in drive configuration 40 and slides therealong to rear abutting shoulder 44.

To attach a hose to second end 22, the hose is slid over enlargement 26. When the end of the hose approaches surface formation 46, the installer is assured that a sufficient length of the hose is present on the nipple to be properly sealed thereon by an appropriate clamp (not shown).

The present invention provides an improved automotive cooling system pipe nipple which is more easily driven for engagement with other cooling system components and which eliminates scratches on fluid contacting surfaces which can form corrosion sites and inhibit fluid flow there along. Further, the invention provides both a physical and visual indication when a hose has been applied over the nipple a length sufficient for proper engagement by a clamp ring used to secure the hose on the nipple. The nipple facilitates attachment by providing an internal drive configuration which readily and properly accepts a drive tool from an entrance chamber receiving and aligning the tool.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A nipple comprising:
   a cylindrical body having an exterior surface, first and second ends and a longitudinal bore there through, said bore defined by an interior surface;
   said first end having a helical thread on said exterior surface;
   said second end having an outwardly extending enlargement spaced slightly inwardly from an outer edge of said second end, said outer edge having an uninterrupted, planar, continuous annular surface and defining a first diameter, and said enlargement being configured to receive a hose thereover; and
   said bore configured at said second end with an entrance chamber of comparatively larger diameter and an internal hexagonal drive configuration of comparatively narrower diameter, said entrance chamber extending inwardly from said outer edge of said second end to said internal drive configuration, said entrance chamber having a portion including a second diameter that is greater than said first diameter, said portion being circumferentially surrounded by said enlargement, said drive configuration being a shape in said interior surface for receiving and engaging a tool therein for axially rotating said nipple, said drive configuration disposed inwardly from said entrance chamber relative to said second end, said drive configuration having an entrance end adjacent said entrance chamber and extending within said bore toward said first end and terminating at a shoulder which is spaced away from said entrance end and farther within said bore against which the tool for rotating said nipple can rest, said shoulder located closer to said second end than said first end.

2. The nipple of claim 1, including a layer of surface protectant on at least a portion of said nipple.

3. The nipple of claim 1, said layer of surface protectant being zinc plating.

4. The nipple of claim 1, said interior surface including a radially inwardly directed angular shoulder from said entrance chamber to said drive configuration.

5. The nipple of claim 1, including a layer of threaded joint sealing material on said thread.

6. The nipple of claim 1, said exterior surface of said nipple having at least one outwardly extending formation between said thread and said enlargement for functioning as a stop for a hose inserted on said nipple.

7. A pipe nipple for an automobile cooling system, said nipple comprising:

a one-piece cylindrical body having an exterior surface, a first end having a thread on said exterior surface adapted for rotational engagement with threads of a cooling system component, a second end adapted to be received in a cooling system hose, said second end having an outwardly extending enlargement positioned inwardly from an outer edge of said second end, said outer edge having an uninterrupted, planar, continuous annular surface and defining a first diameter, and an axial bore extending through said body and defined by an interior surface; and said bore defining an entrance chamber at said second end and an internal hexagonal drive configuration provided in said interior surface between said entrance chamber and said first end, said internal drive configuration being hex-shaped in said interior surface for receiving and engaging a tool therein for rotating said nipple about the axis thereof, said entrance chamber being of larger diameter than said drive configuration, said entrance chamber extending inwardly from said outer edge of said second end to said internal drive configuration, said entrance chamber having a portion including a second diameter that is greater than said first diameter, said portion of said entrance chamber being circumferentially surrounded by said enlargement, and said bore including an angled shoulder transition between said entrance chamber and said hex of said internal drive configuration.

8. The nipple of claim 7, said exterior surface of said nipple having at least one outwardly extending formation between said thread and said second end functioning as a stop for a hose inserted on said nipple.

9. The nipple of claim 7, including a layer of surface protecting material on at least a portion thereof.

10. The nipple of claim 9, said layer comprised of zinc plating or nickel.

11. The nipple of claim 7, including a shoulder at an end of said drive configuration nearest said first end.

12. The nipple of claim 7, including a layer of threaded joint sealing material on said thread.

* * * * *